United States Patent [19]

Konrad

[11] Patent Number: 4,568,114

[45] Date of Patent: Feb. 4, 1986

[54] THREADED PIPE CONNECTOR

[75] Inventor: Mathias Konrad, Siegburg, Fed. Rep. of Germany

[73] Assignee: Jean Walterscheid GmbH, Lohmar, Fed. Rep. of Germany

[21] Appl. No.: 588,111

[22] Filed: Mar. 9, 1984

[30] Foreign Application Priority Data

Mar. 11, 1983 [DE] Fed. Rep. of Germany ....... 3308634
Nov. 18, 1983 [DE] Fed. Rep. of Germany ....... 3341726

[51] Int. Cl.⁴ .............................................. F16L 19/08
[52] U.S. Cl. .................................... 285/341; 285/342; 285/343; 285/382.7
[58] Field of Search .................... 285/341, 382.7, 342, 285/343

[56] References Cited

U.S. PATENT DOCUMENTS 2,490,620 12/1949 Cole et al. ...................... 285/343 X
2,644,700 7/1953 Woodling ......................... 285/343
3,830,532 8/1974 Roberts ........................ 285/382.7 X
4,309,050 1/1982 Legris ......................... 285/382.7 X Primary Examiner—Richard J. Scanlan, Jr.
Attorney, Agent, or Firm—Toren, McGeady, Stanger, Goldberg & Kiel

[57] ABSTRACT

A connector assembly for establishing a fluid type connection with a pipe or tube having a body member with a bore for receiving the tube, a nut which is in threaded engagement on the body member and an intermediate ring compressed between the nut and the body member and having inwardly extending edge formations which cut into the tube in order to retain it within the connector, the intermediate ring being provided with radially outwardly extending axial ribs which cooperate with the body member and the nut to prevent unintentional overtightening of the nut. The ribs may have tapered stop faces which engage a tapered bore portion in the nut and a radial or tapered surface adapted to engage with the body member of the connector assembly.

10 Claims, 8 Drawing Figures

THREADED PIPE CONNECTOR

The present invention relates generally to a threaded connector particularly for pipes or tubing and more particularly to a connector assembly for sealingly engaging a tube to be connected.

The connector assembly of the invention is provided with an intermediate ring adapted to cooperate with a body member and a nut threadedly engaged thereon, the intermediate ring having inwardly directed cutting edges which will cut into the surface of a tube to be connected when the nut is tightened on the body member.

Connectors of the type to which the present invention relates are disclosed in the prior art for example in DE-PS No. 14 50 382. In assemblies of this type, involving threaded cutting ring joints, the cutting ring is provided with several cutters arranged axially one behind the other. The cutting ring described has two bending zones represented by annular grooves or turned in portions and the bending zones operate to impart to the cutting ring an S-shaped form when tightening the threaded joint.

A disadvantage of a design described in the prior art is that when the cutting ring is formed with the S-shaped configuration, there is a risk that it may be deformed beyond its elastic range and after a certain deformation the cutting ring may continue to deform until it has reached the state of complete deformation without further increase in axial force. In such a case, the cutting ring will no longer fulfill its function of axially securing a tube or pipe to be accommodated in sealed engagement.

Accordingly, the present invention is intended to provide a tube connector assembly which overcomes prior art disadvantages and which will avoid excessive deformation of the parts which might hinder proper operating characteristics of the assembly.

SUMMARY OF THE INVENTION

Briefly, the present invention may be described as a tube connector assembly adapted to sealingly engage a tubular member comprising: a body member having a bore adapted to receive therein a tube to be connected, said bore having a tapered configuration with a diameter which increases toward an end thereof; a nut adapted to be in screw threaded engagement with said body member, said nut having a bore with a tapered portion increasing in diameter toward said body member and a cylindrical portion having a diameter greater than the diameter of a tube to be connected; and an intermediate ring interposed between said nut and a tube to be connected, said intermediate ring comprising a plurality of radially inwardly extending sharp-edged formations which are adapted to cut into the material of a tube to be connected by tightening engagement of said nut on said body member and a plurality of uniformly circumferentially spaced radially outwardly extending ribs each provided at one end with a stop face adapted to cooperate with said tapered portion of said bore in said nut and terminating at the opposite end toward said body member short of the end of said intermediate ring.

The connector assembly of the invention is such that the intermediate ring will have a greater axial stiffness and thus will not be so vulnerable to excessive radial deformations.

The provision of the ribs on the intermediate ring operates such that the ring is more resistant to axial compression and therefore its radial deformation will remain within elastic limits. The security of the connection against vibration or oscillation is improved and in accordance with a further advantage the pressure of the contact between the intermediate ring and the nut is reduced because of the greater contact area provided by the stop faces of the ribs. Any tendency of the intermediate ring to dig into the tapered bore portion of the nut is reduced and the ribs, at the ends thereof toward the body member may have radially extending surfaces engageable within end face of the body member. By designing the intermediate ring in accordance with the invention, tightening limits of the connector are accurately defined whereby there may be avoided overtightening and unacceptable deformation of the intermediate ring.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
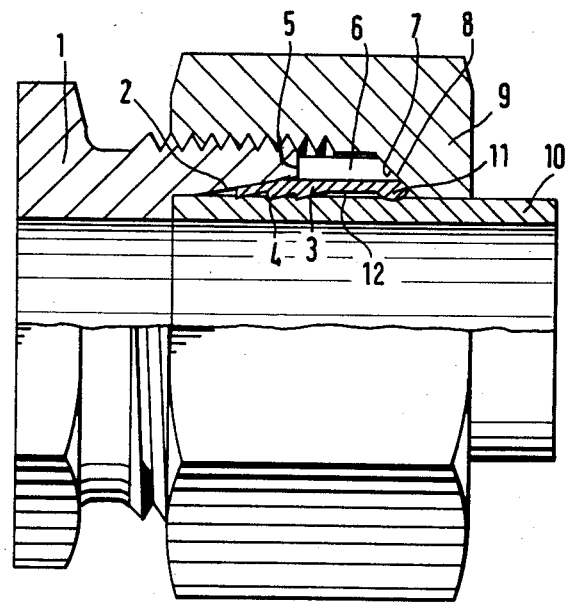
FIG. 1 is a longitudinal sectional view of a connector assembly in accordance with the invention.

Referring now to the drawings wherein similar reference numerals are used to identify like parts throughout the various figures thereof and more particularly referring to FIG. 1 there is shown a connector assembly in accordance with the present invention which comprises a body member 1 having a bore 2 within which there is received a tube or pipe 10 which is to be connected. The bore 2 of the body member 1 increases in diameter with a continuous taper taken from an end face thereof within the body member 1 toward the free end of the body member through which the tube 10 is inserted.

The body member 1 has arranged thereon in threaded engagement a nut 9 having a bore with a tapered portion 8 which increases in diameter toward the body member and which is followed by a cylindrical bore portion before an internally screw threaded part of the nut is reached.

The assembly includes an intermediate ring 3 which is adapted for cooperative engagement between the body member 1 and the nut 9. The intermediate ring 3 at one end thereof engages within the body member 1 and is formed with circumferential inwardly extending cutting formations or edges 4 which, as a result of the engagement of the intermediate ring with tapered bore portion 2 of the body member 1 and as a result of tightening of the nut 9, are caused to dig into or cut the surface of the tube 10 to be connected.

The intermediate ring 3 is also provided with circumferentially spaced radially outwardly extending axial ribs 6. The ribs 6 at the ends thereof facing away from the member 1 are provided with a radially extending stop face 7 which engages with the tapered bore portion 8 of the nut 9. At the opposite ends of the ribs 6 facing toward the body member 1 the ribs 6 terminate in radially outwardly extending surfaces 5 which engage with an end face of the body member 1 located at the termination of the tapered bore 2. The stop faces 5 therefore serve as tightening limitations during tightening of the nut 9 such that if the stop face 5 of the rib 6 is in firm contact with the end face of the body member 1, tightening torque will increase suddenly and prevent overtightening of the nut 9. Thus, when the nut 9 is tightened, the surfaces 5 of the ribs 6 will come into engagement with the end of the body member to prevent a sudden increase in tightening torque and to prevent excessive deformation of the part of the intermediate ring having the cutting formations 4. At the end thereof toward the nut 9, the intermediate ring is formed with an annular bead 11 which engages the tube 10. This ensures that there will be no tendency for this end of the intermediate ring to dig into the tube and cause a notch effect which could reduce the strength thereof.

In the area between the body member 1 and the nut 9, the intermediate ring 3 may be formed with a configuration or design suitable to particular requirements with respect to its radial deformability without affecting its axial strength which is achieved by virtue of the presence of the ribs 6.

Figure 2:
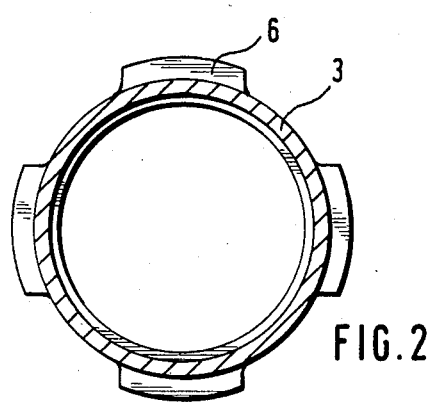
FIG. 2 is a sectional view taken through an intermediate ring of the connector assembly of FIG. 1.

The configuration of the ribs 6 may be seen more clearly from an axial view shown in FIG. 2.

Figure 3:
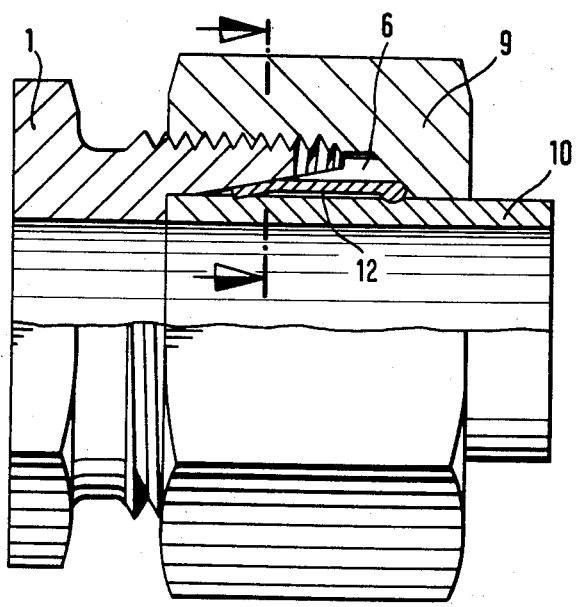
FIG. 3 is a longitudinal sectional view taken through another embodiment of the invention.

A modification of the invention is shown in FIG. 3 wherein the ribs 6 on the intermediate ring 3 taper at their ends toward the body member 1 to engage with the tapered bore in the body member 1. The embodiment of FIG. 3 is essentially similar to that of FIG. 1 except that the stop faces 5 are replaced with the tapered portion which engages within the bore in the body member 1. With the tapered ribs shown in FIG. 3, larger tolerances in tube diameter may be accommodated since the intermediate ring can move further into the tapered bore 2 of the body member 1.

Figure 4:
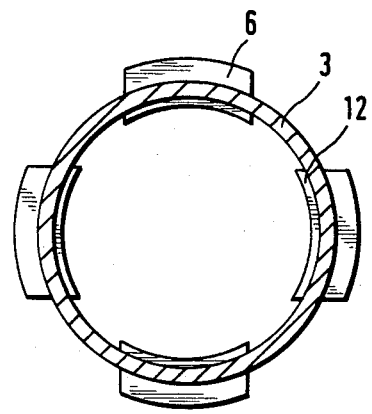
FIG. 4 is a cross-sectional view through a modified form of the intermediate ring.

Furthermore, in FIG. 4 there is shown an intermediate ring in the case of which the two inner cutters are interrupted, i.e., the cutting formations of the intermediate ring may be circumferentially discontinuous.

In FIG. 4, the intermediate ring which is shown is provided with additional ribs 12 which point radially inwardly.

FIGS. 5–8 relate to a connector assembly wherein the ribs 6 of the intermediate ring 3 have at the ends thereof toward the nut 9 stop faces 7b which are slightly offset toward the center of the ring from an end 7a thereof. The offset dimension 13 shown in FIG. 5 may be several tenths of a millimeter and may be varied depending upon the size of the connector assembly.

Figure 5:
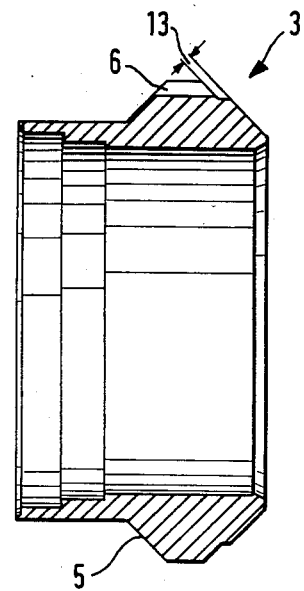
FIG. 5 is a longitudinal sectional view of an intermediate ring in accordance with the invention.
Figure 6:
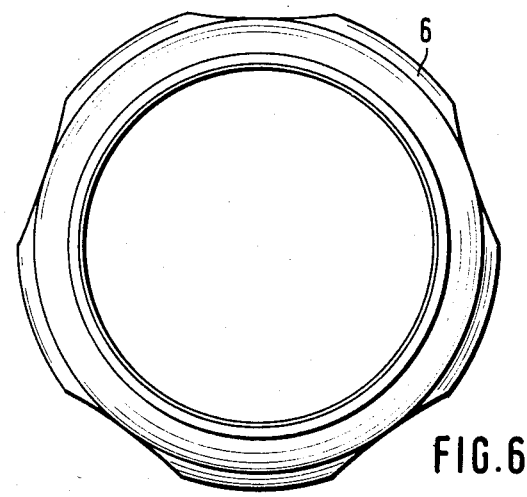
FIG. 6 is an end view of the ring of FIG. 5.
Figure 7:
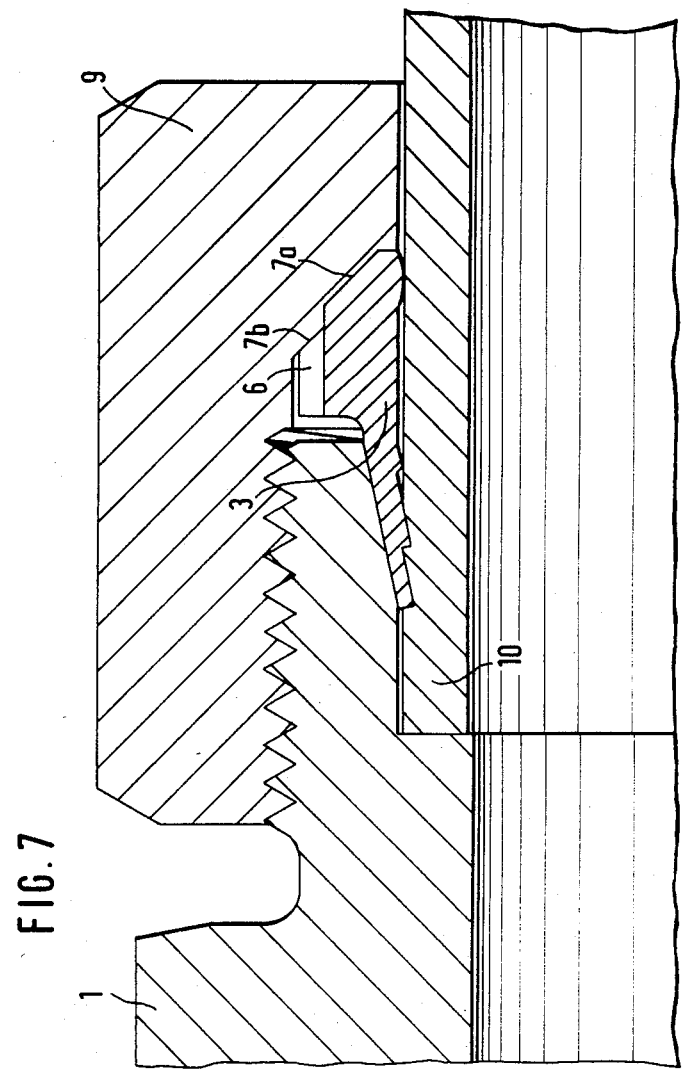
FIG. 7 is a longitudinal sectional view through a connector assembly utilizing the ring of FIG. 5.
Figure 8:
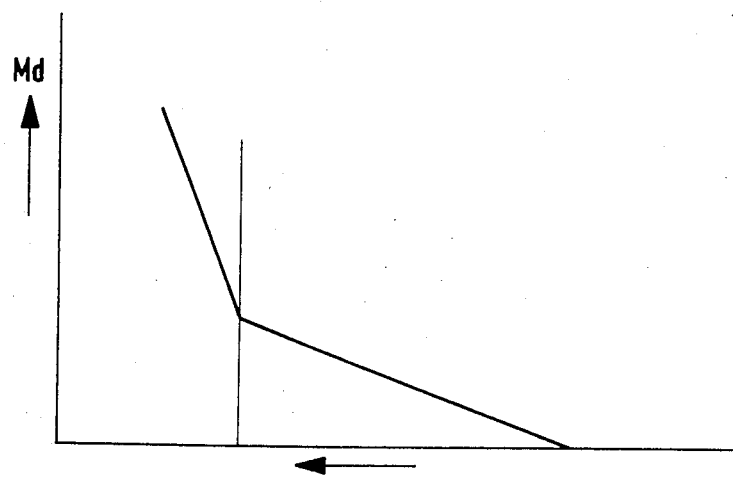
FIG. 8 is a graphical representation of the changes which occur in tightening torque of a connector assembly in accordance with the invention.

In FIG. 6 there is shown an end view of the intermediate ring illustrated in FIG. 5. FIG. 7 shows a tightened connector assembly wherein the end 7a of the intermediate ring 3 has worked itself into the tapered part of the nut 9 until the tapered stop face 7b of the illustrated rib 6 has engaged the nut. The effect of this is a sudden increase in the tightening torque required on the nut 9 thereby providing an indication that the connector has been correctly tightened. This increase in tightening torque is depicted in the graph of FIG. 8 wherein tightening torque Md is plotted against tightening distance of the nut and is indicated by the change in gradient of the line shown in the diagrammatic graph.

Thus, it will be seen that in accordance with the present invention, as the nut 9 is tightened on the body member 1, the intermediate ring 3 will be brought into engagement between the tapered bore 2 of the body member 1 and a tube 10 to be connected so that the cutting formations 4 on the intermediate ring 3 will dig into the tube to increase or enhance the fluid tightness of the connection. The axial ribs 6 on the outer side of the intermediate ring 3 engage between the body member 1 and the nut 9 in order to prevent overtightening or excessive deformation of the ring 3.

As will be seen from the drawings, the ribs at their ends away from the body member 1 may be formed with tapered faces 7 and at the other ends thereof the stop faces 5 may operate to prevent further tightening of the nut 9 from deforming the ring.

Alternatively, the ribs at their other ends toward the body member 1 may taper so as to be engageable within the tapered bore in the body member thereby to provide for taking up of tolerances in the tube diameter and the dimensions of the intermediate ring.

The intermediate ring may be formed with the annular bead formation 11 at its nut engaging end and thereby there may be provided a further possibility for controlling the elastic behavior of the intermediate ring in the radial direction.

Some of the cutting formations on the intermediate ring may be circumferentially interrupted and the maximum diametral dimension of the intermediate ring over the ribs may be substantially equal to the diameter of the cylindrical bore portion of the nut. This is advantageous in that it limits the radial deformability of the intermediate ring insofar as, after a prespecified degree of deformation, it rests against the inner wall of the nut and can deform no further.

In extending the object of the invention, the intermediate ring may be capable of providing the user of a connector a clear indication of when the tightening range of the nut and the connector has been exceeded.

For this purpose, the invention provides that the stop faces of the ribs may be displaced slightly toward the center of the intermediate ring from the end thereof and such displacement may, for example, be several tenths of a millimeter.

When the nut of a connector assembly having the intermediate ring is tightened, the stop faces of the ribs will not be engaged by the nut during initial tightening and a constant flat increase in the tightening torque may be achieved. However, after a certain point, the nut will engage the ribs and a sudden increase in tightening torque will occur, as depicted in FIG. 8. In addition to the increase in the area of the intermediate ring engaged by the nut, high cutting forces occur at the edges of the ribs engaging the nut.

While specific embodiments of the invention have been shown and described in detail to illustrate the application of the inventive principles, it will be understood that the invention may be embodied otherwise without departing from such principles.

What is claimed is:

1. A tube connector assembly adapted to sealingly engage a tubular member comprising:

a body member having a bore adapted to receive therein a tube to be connected, said bore having a tapered configuration with a diameter which increases toward an end thereof;

a nut adapted to be in screw threaded engagement with said body member, said nut having a bore with a tapered portion increasing in diameter toward said body member and a cylindrical portion having a diameter greater than the diameter of a tube to be connected; and an intermediate ring interposed between said nut and a tube to be connected, said intermediate ring comprising a plurality of radially inwardly extending sharp-edged formations which are adapted to cut into the material of a tube to be connected by tightening engagement of said nut on said body member and a plurality of uniformly circumferentially spaced radially outwardly extending ribs each provided at one end with a stop face adapted to cooperate with said tapered portion of said bore in said nut and terminating at the opposite end toward said body member short of the end of said intermediate ring.

2. An assembly according to claim 1 wherein said ribs at said opposite end are formed with said radially extending surfaces engageable with an end face of the body member.

3. An assembly according to claim 1 wherein said ribs at their opposite ends are tapered to engage within said tapered bore in said body member.

4. An assembly according to claim 1 further comprising an annular bead on said intermediate ring at the end thereof toward said nut and further axial ribs on the interior thereof between said bead and said cutting formations.

5. An assembly according to claim 1 wherein the maximal diametral dimension of said intermediate ring at said ribs is substantially equal to the diameter of said cylindrical portion of said bore in said nut.

6. An assembly according to claim 1 wherein said stop faces of said ribs are displaced slightly toward the center of said intermediate ring from the end thereof.

7. A tube connector assembly adapted to sealingly engage a tubular member comprising:

a body member having a bore adapted to receive therein a tube to be connected, said bore having a tapered configuration with a diameter which increases toward an end thereof through which said tubular member is inserted;

a nut adapted to be in screw threaded engagement with said body member;

an intermediate ring interposed between said nut and said body member adapted to be wedged between said body member and a tube to be connected when said nut is threadedly tightened on said body member;

sharp edged formations on said intermediate ring adapted to cut into said tube when said intermediate ring is wedged by tightening of said nut between said body member and said tube; and a plurality of ribs on said intermediate ring adapted to be engaged between said nut and said body member, said ribs having stop faces at opposite axial ends thereof engaging said nut and said body member to limit the amount of tightening engagement of said nut on said body member.

8. An assembly according to claim 7 wherein said ribs are formed with radially extending stop faces engaging said body member.

9. An assembly according to claim 7 wherein said ribs at an end thereof facing said body member are formed with a tapered configuration adapted to engage within said bore in said body member to gradually limit the degree to which said nut may be tightened on said body member.

10. An assembly according to claim 7 wherein said intermediate ring is formed with an end face adapted to be engaged by said nut and wherein said ribs are formed with a stop face adapted to be engaged by said nut, said end face of said intermediate ring and said stop faces of said ribs being offset in the axial direction of said intermediate ring.

* * * * *